(12) United States Patent
Ardrey

(10) Patent No.: US 10,029,627 B2
(45) Date of Patent: Jul. 24, 2018

(54) VEHICLE EXTERIOR GUARD ASSEMBLY

(71) Applicant: Michael Ardrey, Raleigh, NC (US)

(72) Inventor: Michael Ardrey, Raleigh, NC (US)

( * ) Notice: Subject to any disclaimer, the term of this patent is extended or adjusted under 35 U.S.C. 154(b) by 88 days.

(21) Appl. No.: 15/337,315

(22) Filed: Oct. 28, 2016

(65) Prior Publication Data

US 2018/0118133 A1    May 3, 2018

(51) Int. Cl.
B60R 13/04    (2006.01)

(52) U.S. Cl.
CPC .................................. B60R 13/04 (2013.01)

(58) Field of Classification Search
CPC ...................................................... B60R 13/04
USPC ........................................................ 293/128
See application file for complete search history.

(56) References Cited

U.S. PATENT DOCUMENTS

| | | | |
|---|---|---|---|
| 3,659,887 A * | 5/1972 | Marquette | B60R 13/04 293/120 |
| 5,320,392 A | 6/1994 | Hart | |
| 5,333,923 A * | 8/1994 | Whitfield | B60R 13/04 293/128 |
| 6,406,080 B1 | 6/2002 | Davis | |
| 6,736,435 B1 * | 5/2004 | Ditthavong | B60R 19/42 293/128 |
| 7,090,266 B1 | 8/2006 | Price | |
| 7,163,244 B2 * | 1/2007 | Meltzer | B60R 19/44 293/128 |
| 7,229,108 B2 | 6/2007 | Hochrein | |
| 8,201,860 B2 | 6/2012 | Kalmus | |
| 8,496,267 B2 * | 7/2013 | Wohlberg | B60J 11/06 280/770 |
| 2003/0209914 A1 * | 11/2003 | Cano | B60R 19/42 293/128 |
| 2010/0295325 A1 | 11/2010 | Curtis | |
| 2015/0123412 A1 * | 5/2015 | Kim | B60R 13/043 293/128 |
| 2016/0207475 A1 * | 7/2016 | Ardrey | B60R 13/04 |

* cited by examiner

*Primary Examiner* — Gregory A Blankenship
(74) *Attorney, Agent, or Firm* — Global Intellectual Property Agency, LLC; Jordan Sworen

(57) ABSTRACT

A guard assembly for an exterior of a vehicle. The assembly includes an outer section, an intermediate section, and an inner section telescopically engaged with each other. The intermediate and inner sections can be slidably extended from the outer section so that the length of the assembly can be customized for each particularly vehicle. The sections are engaged by a rail and complementary slot mechanism, which allows for the sections to be moved longitudinally with respect to each other. Each section includes a magnet positioned on their lower surfaces. The magnet allows the assembly to be removably secured to the exterior surface of the door of a vehicle. The sections are additionally configured so that their lower surfaces are coplanar with each other when the sections are extended, allowing the assembly to rests flush against the exterior of the vehicle.

6 Claims, 4 Drawing Sheets

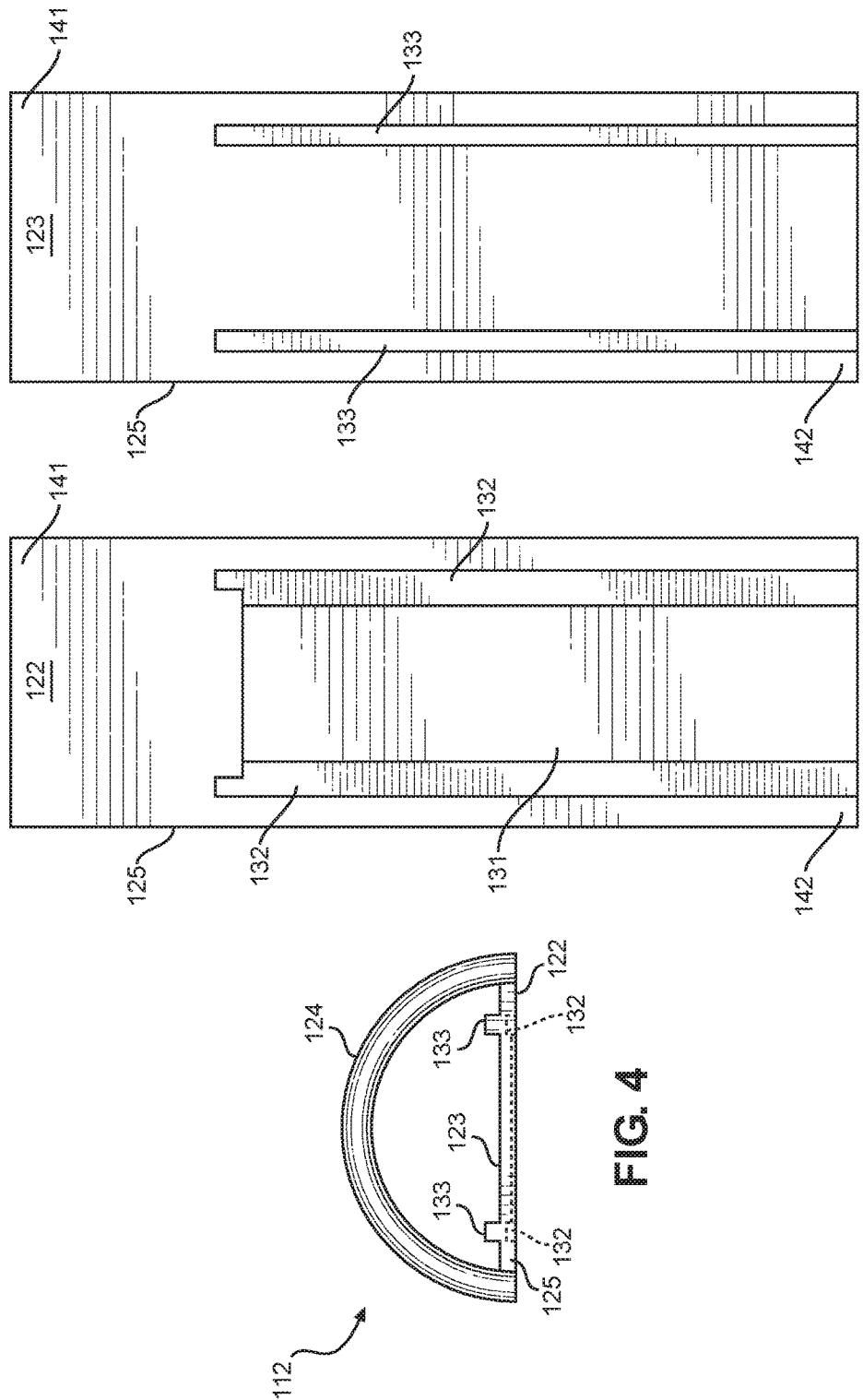

US 10,029,627 B2

VEHICLE EXTERIOR GUARD ASSEMBLY

BACKGROUND OF THE INVENTION

The present invention relates to guards for vehicle exteriors. More specifically, the present invention relates to extendable door guards that are removably securable to an exterior surface of a vehicle door.

Parking lots and parking garages often have parking spaces that leave little room between adjacent vehicles when the spaces are filled. As a result, it is common for a driver or passenger of one vehicle to be unable to fully open their door to enter or exit the vehicle without having the door contact an adjacent car. When a person exits a vehicle and opens the door, the door may strike the adjacent vehicle causing a dent or scratch. This type of vehicle damage is difficult to avoid and can be expensive to repair.

Further, vehicles in public parking areas at malls or grocery stores are at risk of being struck by various objects and other vehicles. For example, a shopping cart in a parking lot may roll towards a parked vehicle, striking the vehicle and causing damage thereto. Such low-speed collisions are frequent occurrences in public places and result in scratches and dents to the vehicle. The sides or doors of a vehicle are most vulnerable to this type of damage as the sides of the vehicle lack bumpers or other protective devices. Thus, a device for protecting the sides of a vehicle from scratches and dents in the event of a low-speed collision is desired.

SUMMARY OF THE INVENTION

In view of the foregoing disadvantages inherent in the known types of vehicle door guards now present in the prior art, the present invention provides a vehicle exterior guard assembly. The present assembly includes an outer section, an intermediate section, and an inner section telescopically engaged with each other. The intermediate and inner sections can be slidably extended from the outer section so that the length of the assembly can be customized for each particularly vehicle. The sections are engaged by a rail and complementary slot mechanism, which allows for the sections to be moved longitudinally with respect to each other. Each section includes a magnet positioned on their lower surfaces. The magnet allows the assembly to be removably secured to the exterior surface of the door of a vehicle. The sections are additionally configured so that their lower surfaces are coplanar with each other when the sections are extended, allowing the assembly to rests flush against the exterior of the vehicle.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 4 shows a sectional view of a vehicle exterior guard assembly along line 4-4.

FIG. 5 shows an elevational view of a lower surface of a bottom member of a vehicle exterior guard assembly.

FIG. 6 shows an elevational view of an upper surface of a bottom member of a vehicle exterior guard assembly.

DETAILED DESCRIPTION OF THE INVENTION

Figure 1:
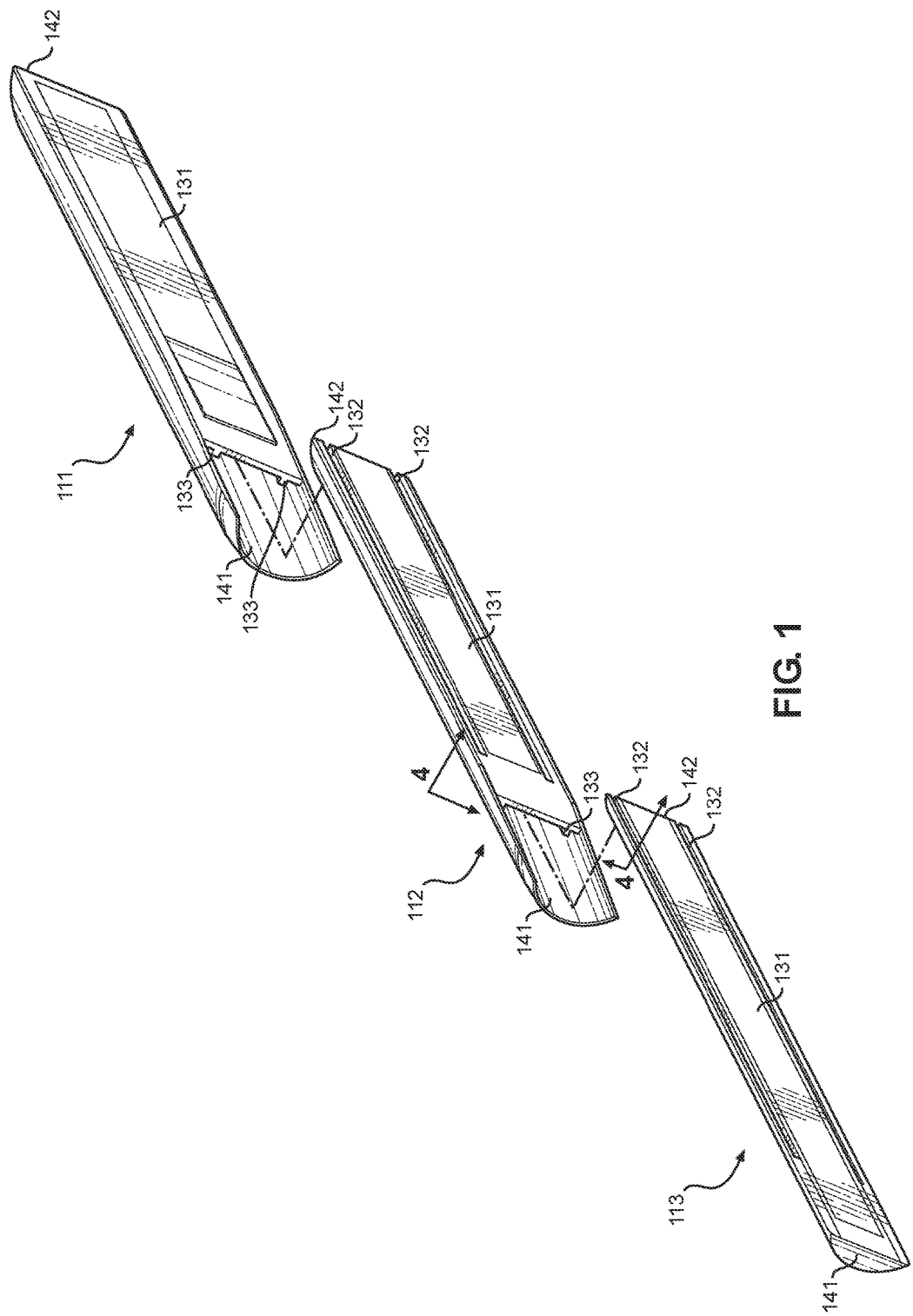
FIG. 1 shows a perspective view of a vehicle exterior guard assembly.

Reference is made herein to the attached drawings. Like reference numerals are used throughout the drawings to depict like or similar elements of the assembly. The figures are intended for representative purposes only and should not be considered to be limiting in any respect.

Figure 2:
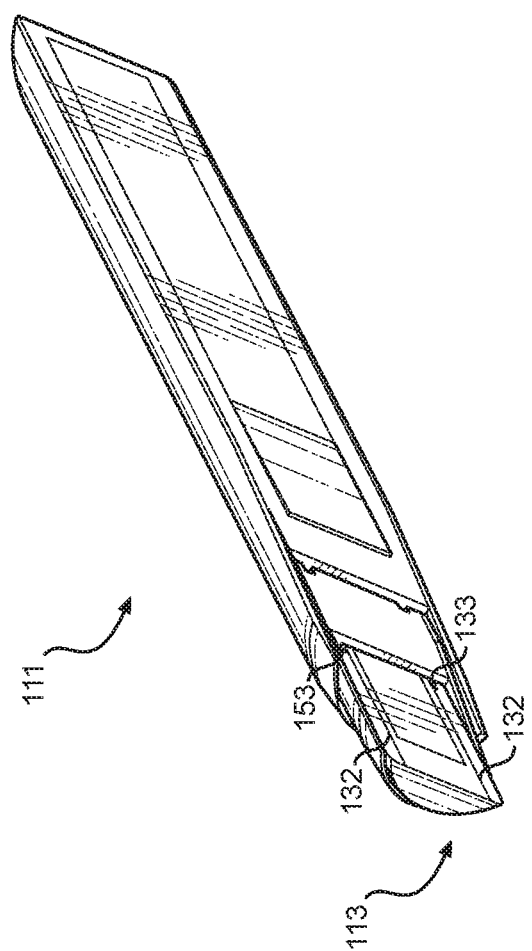
FIG. 2 shows a perspective view of a vehicle exterior guard assembly.
Figure 3:
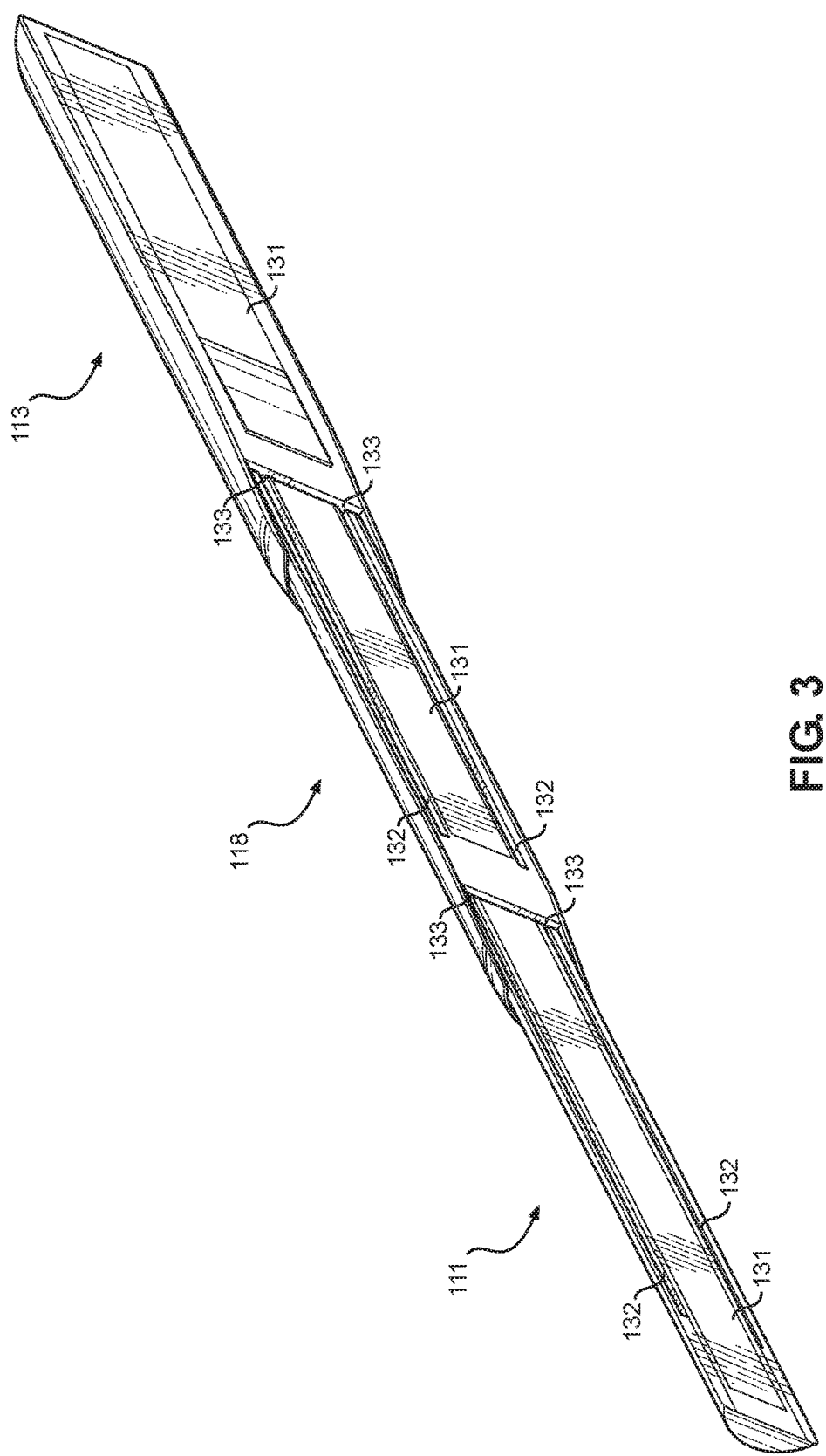
FIG. 3 shows an exploded view of a vehicle exterior guard assembly.

Referring now to FIGS. 1-3, there are shown perspective views of a vehicle exterior guard and an exploded view thereof. The present vehicle exterior guard is an extendable assembly of telescopic sections that is removably affixable to an exterior of a vehicle, e.g. an automobile, to prevent objects from making contact and damaging the vehicle. The vehicle exterior guard assembly includes an outer section 111 that is configured to slidably receive an inner section 113 therein. One embodiment of the assembly further includes one or more intermediate sections 112 situated between the outer section 111 and the inner section 113. The one or more intermediate sections 112 telescopically receive the inner section 113 and are in turn telescopically received by the outer section 111. In an illustrative embodiment, the assembly includes one intermediate section 112; however, no claim is made as to the precise number of intermediate sections.

The outer, intermediate, and inner sections 111, 112, 113 are slidably engaged with each other via rails 133 disposed on the outer and intermediate sections 111, 112 that engaged complementary slots 132 disposed on the intermediate and inner sections 112, 113. In the depicted embodiment, the outer section 111 includes rails 133 disposed on the upper surface of its planar bottom panel. The rails 133 of the outer section 111 are configured to engage the slots 132 disposed on the lower surface of the planar bottom panel of the outermost intermediate section 112. In embodiments of the present assembly including multiple intermediate sections 112, each intermediate section 112 is then slidably engaged with each successively inner intermediate section 112 in the same manner. The rails 133 disposed on the upper surface of the planar bottom panel of the innermost intermediate section 112 are configured to engage the slots 132 disposed on the lower surface of the planar bottom panel of the inner section 113. In the depicted embodiment wherein the assembly includes a single intermediate section 112, the single intermediate section 112 is directly engaged with both the outer section 111 and the inner section 113. In one embodiment, the lower surface of the planar bottom member of the outer section 111 lacks slots 132 thereon; likewise, the upper surface of the planar bottom member of the inner section 113 lacks rails 133 extending therefrom.

The intermediate section 112 includes a hollow interior that corresponds in size to the inner section 113 and the outer section 111 likewise includes a hollow interior that corresponds in sizer to the intermediate section 112. The telescopic sections can be extended from the outer section 111 and from each other in order to extend the length of the assembly. This allows the assembly to accommodate differently sized vehicles.

The outer section 111, the intermediate section 112, and the inner section 113 correspond in size to each other such that intermediate section 112 and the inner section 113 each substantially occupy the hollow interior volume of the overlying section. In the depicted embodiment of the present assembly, the outer section 111, the intermediate section 112, and the inner section 113 each have a cross-sectional semicircular shape. The diameter of the semicircular cross-section of the sections 111, 112, 113 decreases from the outer section 111 to the inner section 113, thereby allowing each successively smaller underlying section to be received within the larger overlying section with which it is engaged. When the assembly is in its collapsed configuration, the outer section 111 encloses each of the intermediate section 112 and the inner section 113, such that the volume of the outer section 111 is the total volume occupied by the vehicle exterior guard assembly.

The outer section 111, the intermediate section 112, and the inner section 113 are each elongated members fabricated from a material that is configured to absorb impacts without transferring the force from the impact to the underlying vehicle exterior. Such materials include rubber or rubber-based materials, injection-molded plastic, or any other materials configured to attenuate impacts.

Each of the outer section 111, the intermediate section 112, and the inner section 113 includes a first end 141 and a second end 142 that opposes the first end 141. In an illustrative embodiment, each of the first ends 141 of the outer section 111 and the intermediate section 112 includes a tapered portion defining a gradual transition from the overlying section to the underlying section having a smaller diameter.

The undersurface 123 of each of the outer section 111, intermediate section 112, and the inner section 113 further includes a magnet 131 thereon. The magnets 131 are configured to allow the assembly to be removably secured to the exterior of a vehicle. When secured to the exterior of a vehicle, the arcuate portions of the sections of the assembly project from the exterior of the vehicle, preventing many objects, e.g., shopping carts and automobile doors, from making contact with the exterior of the vehicle to which the assembly is attached. The magnets 131 may include, but are not limited to, e.g., high-energy strip magnets and rare earth magnets. In one embodiment, the magnets 131 rest flush with the surrounding lower surface of the planar member of the section on which the magnet 131 is disposed.

Referring now to FIG. 4, a sectional view of a vehicle exterior guard assembly along line 4-4. Although the section depicted in FIG. 4 is an intermediate section 112, it should be recognized that the principles with respect to the configuration of the construction of the intermediate section 112 and the configuration of the components of the intermediate section 112 are equally applicable to each of the inner section 113 and the outer section 111, contingent upon the descriptions of these sections as discussed above.

Each of the sections 111, 112, 113 of the assembly is constructed from an arcuate member 124 and a planar member 125, which together in combination define a closed semicircular shape in cross-section. In one embodiment, the arcuate member 124 and the planar member 125 are constructed separately and then joined via heat welding or another such technique. In another embodiment, the arcuate member 124 and the planar member 125 are constructed from as a single integral component via injection molding or another such technique.

The rails 133 extending from the upper surface 123 of the planar member 125 are substantially aligned with the slots 132 disposed on the lower surface 122 thereof. The positional alignment between the rails 133 and the slots 132 allows the rails 133 of an overlying section to engage the slots 132 of an underlying section when successive sections are secured together. In one embodiment, the height of the rails 133 is equal to the depth of the slots 132 to a close tolerance thereof for each of the sections. The height of the rails 133 being equal or substantially equal to the depth of the slots 132 allows the lower surface 122 of each of the sections to rest coplanar with each other, creating a continuous, planar surface along the length of the assembly regardless of the number of sections that are extended.

Referring now to FIGS. 5-6, there are shown elevational views of a lower and an upper surface of a bottom member of a vehicle exterior guard assembly. The length of the rails 133 is equal to a length of the slots 132 to a close tolerance thereof. This allows the slidable engagement between the rails 133 of an overlying section and the slots 132 of an underlying section to be maintained along the entire length of the slots 132.

In one embodiment of the assembly, the slots 132 are offset from the first end 141 of each section by a distance. In this illustrative embodiment, the rails 133 are likewise offset from the second end 142 of each section by a distance. This offset defines a stop, which prevents the rails 133 from being disengaged from the slots 132 as an underlying section is extended from an overlying section of the assembly.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A guard assembly, comprising:
an outer section, an intermediate section, and an inner section telescopically engaged with each other;
each of the outer section, the intermediate section, and the inner section including an arcuate member and a planar member defining a closed semicircular shape;
an upper surface of the planar member of the outer section including a rail;
a lower surface of the planar member of the intermediate section including a slot, the slot configured to slidably engage the rail of the outer section;
an upper surface of the planar member of the intermediate section including a rail;
a lower surface of the planar member of the inner section including a slot, the slot configured to slidably engage the rail of the intermediate section;
wherein a height of the rail of each of the outer section and the intermediate section is equal to a depth of the slot of each of the intermediate section and the inner section; and
a magnet disposed on each of a lower surface of the inner section, the lower surface of the intermediate section, and the lower surface of the outer section, each magnet configured to rest flush with the respective lower surface.

2. The guard assembly of claim 1, the outer section and the intermediate section each including a first end and a second end opposing the first end, the first end including a tapered portion.

3. The guard assembly of claim 1, wherein a diameter of each underlying section is successively smaller than a diameter of an overlying section.

4. The guard assembly of claim 1, wherein each of the outer section, the intermediate section, and the inner section are constructed from a force-attenuating material.

5. The guard assembly of claim 1, each of the outer section, the intermediate section, and the inner section including a first end and a second end opposing the first end, wherein each rail is separated from the first end of each respective section by an offset.

6. The guard assembly of claim 1, each of the outer section, the intermediate section, and the inner section including a first end and a second end opposing the first end, wherein each slot is separated from the second end of each respective section by an offset.

* * * * *